(12) United States Patent
Troester et al.

(10) Patent No.: US 9,367,310 B2
(45) Date of Patent: Jun. 14, 2016

(54) STACK ACCESS TRACKING USING DEDICATED TABLE

(71) Applicant: Advanced Micro Devices, Inc., Sunnyvale, CA (US)

(72) Inventors: Kai Troester, Pepperell, MA (US); Luke Yen, Raleigh, NC (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 442 days.

(21) Appl. No.: 13/922,340

(22) Filed: Jun. 20, 2013

(65) Prior Publication Data

US 2014/0380022 A1     Dec. 25, 2014

(51) Int. Cl.
*G06F 9/44* (2006.01)
*G06F 9/30* (2006.01)
*G06F 9/38* (2006.01)

(52) U.S. Cl.
CPC ............ *G06F 9/3004* (2013.01); *G06F 9/3826* (2013.01); *G06F 9/3834* (2013.01); *G06F 9/3838* (2013.01)

(58) Field of Classification Search
CPC .................................. G06F 8/10; G06F 8/109
See application file for complete search history.

(56) References Cited

U.S. PATENT DOCUMENTS

| | | |
|---|---|---|
| 5,968,169 A | 10/1999 | Pickett |
| 6,148,391 A | 11/2000 | Petrick |
| 2006/0195824 A1 | 8/2006 | Iwamoto |
| 2007/0130448 A1 | 6/2007 | Jourdan et al. |

OTHER PUBLICATIONS

U.S. Appl. No. 13/922,296, filed Jun. 20, 2013, entitled "Stack Access Tracking".

*Primary Examiner* — Cheng-Yuan Tseng (57) ABSTRACT

A processor employs a prediction table at a front end of its instruction pipeline, whereby the prediction table stores address register and offset information for store instructions; and stack offset information for stack access instructions. The stack offset information for a corresponding instruction indicates the location of the data accessed by the instruction at the processor stack relative to a base location. The processor uses pattern matching to identify predicted dependencies between load/store instructions and predicted dependencies between stack access instructions. A scheduler unit of the instruction pipeline uses the predicted dependencies to perform store-to-load forwarding or other operations that increase efficiency and reduce power consumption at the processing system.

20 Claims, 6 Drawing Sheets

FIG. 6

STACK ACCESS TRACKING USING DEDICATED TABLE

CROSS-REFERENCE TO RELATED APPLICATIONS

Application Ser. No. 13/922,296, filed of even date herewith, entitled "STACK ACCESS TRACKING" by Kai Troester and Luke Yen and assigned to the assignee hereof is incorporated by reference as if fully set forth herein.

BACKGROUND

1. Field of the Disclosure

The present disclosure generally relates to processors and more particularly to tracking stack accesses at a processor.

2. Description of the Related Art

Some processing systems employ a hardware stack to simplify memory management for particular operations. The stack is a designated portion of memory whereby the processing system typically stores and retrieves from the stack in a last-in, first-out manner, rather than via direct access to the individual memory locations of the stack. Accesses to the stack therefore typically require access to a processor cache or memory external to the processor. Such accesses can consume a relatively high amount of power and can impact efficiency of the processor.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-6 illustrate techniques for improving efficiency at a processing system by tracking relationships between stack access instructions. A processor of the processing system employs a two prediction tables at a front end of its instruction pipeline, whereby one of the prediction tables stores stack offset information for stack access instructions and the other prediction table stores address register information for non-stack memory access instructions. The stack offset information for a corresponding instruction indicates the location of the data accessed by the instruction at the processor stack relative to a base location. The processor uses pattern matching to identify predicted dependencies between stack access instructions based on one of the prediction tables and uses different pattern matching to identify between load/store instructions based on the other of the prediction tables. A scheduler unit of the instruction pipeline uses the predicted dependencies to perform store-to-load forwarding or other operations that increase efficiency and reduce power consumption at the processing system. By employing different tables for stack access and non-stack memory access instructions, the pattern matching at each table can be simplified relative to using a combined table for both types of instructions, thereby improving prediction efficiency and simplifying the logic used to implement the pattern matching.

As used herein, a stack access instruction refers to an instruction that accesses a defined region of memory referred to as a stack, whereby the processor uses a stack pointer implied in the instruction to determine the corresponding memory location to be accessed, rather than a memory address explicitly provided by the instruction. Examples of stack access instructions include push, pop, call, and return instructions, and load/store instructions that use the stack pointer to access the stack. An explicit load/store instruction, in contrast to a stack access instruction, is an instruction whereby the processor accesses a particular memory location indicated by an address provided by the load/store instruction itself. Explicit load/store instructions include load/store instructions that access a location in the stack using the explicit memory address for the location, rather than using the stack pointer.

Figure 1:
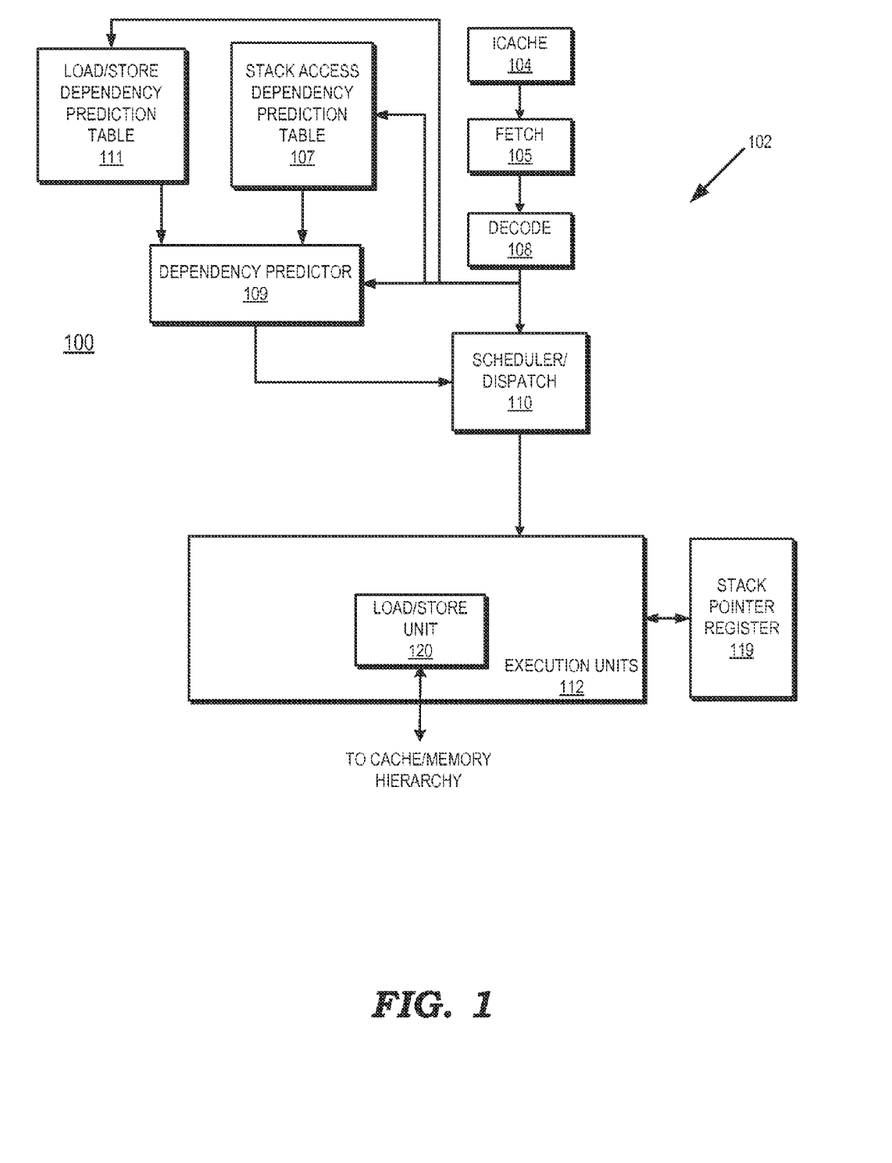
FIG. 1 is a block diagram of a processor in accordance with some embodiments.

FIG. 1 illustrates a processor core 100 of a processor having an instruction pipeline 102 that processes both load/store instructions and stack access instructions in accordance with some embodiments. The illustrated processor core 100 can include, for example, a central processing unit (CPU) core based on an x86 instruction set architecture (ISA), an ARM ISA, and the like. The processor can implement a plurality of such processor cores, and the processor can be implemented in any of a variety of electronic devices, such as a notebook computer, desktop computer, tablet computer, server, computing-enabled cellular phone, personal digital assistant (PDA), set-top box, and the like.

In the depicted example, the processor core 100 implements an instruction pipeline 102 including an instruction cache 104, a fetch stage 105, a decode stage 108, a scheduler/dispatch unit 110, and execution units 112. The execution units 112 include a load/store unit (LSU) 120 connected to a memory hierarchy, including one or more levels of cache (e.g., L1 cache, L2, cache, etc.), a system memory, such as system RAM, and one or more mass storage devices, such as a solid-state drive (SSD) or an optical drive.

The instruction cache 104 stores instruction data which is fetched by the fetch stage 105 in response to demand fetch operations (e.g., a fetch to request the next instruction in the instruction stream identified by the program counter) or in response to speculative prefetch operations. The decode stage 108 decodes instructions fetched by the fetch stage 105 into one or more operations that are to be performed, or executed, by the execution units 111. In a microcoded processor architecture, this decoding can include translating the instruction into one or more micro-operations (uOps), whereby each uOp is identified by a corresponding opcode value and can be separately executed within the execution units 111. For instructions that are to store data to memory, including store instructions and stack access instructions that place data on the stack (e.g. push instructions) the decode stage 108 generates store operations to store the data including stack access operations that store data to the stack (e.g. push operations).

Similarly, for instructions that are to retrieve data from memory, the decode stage generates load operations including stack access operations that retrieve data from the stack (e.g. pop operations). The scheduler/dispatch stage 110 schedules operations for execution at one or more of the execution units 111. Accordingly, the scheduler/dispatch stage 110 resolves dependencies between operations, such as dependencies between load and store operations, and schedules operations for execution so that dependent instructions are executed in-order with respect to the instructions from which they depend. The scheduler/dispatch stage 110 can also perform other functions to enhance processing efficiency, including store-to-load forwarding as described further herein.

The instruction pipeline 102 also includes a dependency predictor 109 that uses a load/store dependency prediction table 111 to predict if a fetched load instruction is dependent on a previously fetched store instruction and a stack access dependency prediction table 107 to predict if a fetched stack access instruction is dependent on a previously fetched stack access instruction. As used herein, a load instruction is dependent on a store instruction if the load instruction loads data from a memory address targeted by the store instruction (as indicated by the destination operand of the store instruction), and there are no intervening instructions that store data to the memory address. For example, in the following instruction sequence:

|            |          |
|------------|----------|
| ST [RBI], RAX | (STORE1) |
| LD RBX, [RBI] | (LOAD1)  |
| ADD RBI, 1    | (ADD1)   |
| LD RBX, [RBI] | (LOAD2)  | the LOAD1 is dependent on the STORE1 instruction because the LOAD1 instruction loads data from the memory address indicated by the destination operand of the STORE1 instruction, and there are no intervening instructions that store data to the memory address. In addition, the LOAD2 instruction is not dependent on the STORE instruction because the intervening ADD1 instruction changes the destination operand (RBI) of the STORE1 instruction.

As used herein Stack Access Instruction B is dependent on a previous Stack Access Instruction if 1) Stack Access Instruction A stores data to a given memory location of the stack; 2) Stack Access Instruction B retrieves data from the given memory location of the stack; and 3) there are no intervening instructions that store or otherwise alter the data stored at the given memory location of the stack. For example, in the following instruction sequence:

|          |         |
|----------|---------|
| PUSH RAX | (PUSH1) |
| PUSH RBX | (PUSH2) |
| POP RBX  | (POP1)  |
| POP RAX  | (POP2)  | the POP1 instruction is dependent on the PUSH2 instruction, since POP1 accesses the same memory location of the stack as PUSH2 and there are no intervening instructions that change the memory location of the stack. For similar reasons, POP2 is dependent on PUSH1.

In some embodiments, for each store instruction the dependency predictor 109 stores, at the load/store dependency prediction table 111, information indicating which registers and offset are used by the corresponding store instruction to access a memory location. In some embodiments, the set of store instructions is selected by the dependency predictor 109 to reduce the likelihood that there are intervening instructions that sever the dependency between the load and store instructions predicted as dependent. For example, to eliminate false dependencies the dependency predictor 109 can keep track of the oldest store that writes a predicted memory address and any instructions that may invalidate the prediction of a memory address. The latter may happen if an instruction potentially changes the value of a register used for indexing a given store.

The dependency predictor 109 compares, for each load instruction, the registers and displacement used for memory access to the corresponding address registers and offsets of the store instructions recorded at the dependency load/store dependency prediction table 111, whereby a match in the registers and displacement indicates a prediction that the load instruction is dependent on the matching store instruction. In response to predicting that a load instruction is dependent on a store instruction, the dependency predictor 109 indicates the dependency to the scheduler/dispatch unit 110. In response, the scheduler/dispatch unit 110 forwards the data for the store instruction (i.e. the data to be stored) to the load instruction.

For each stack access instruction, the dependency predictor 109 stores at the stack access dependency prediction table 107 an offset value indicating the predicted location of the stack access, relative to a defined initial position. For some types of stack access instructions, such as push and pop instructions, the offset value changes by a defined amount corresponding to the type of instruction, while for other instructions the offset is a variable amount indicated by a field of the stack access instruction.

To illustrate using the example above, assuming that each push and pop instruction changes the location of the stack pointer by 16 bytes, the offset for each stack access instruction is as follows:

|          |         |              |
|----------|---------|--------------|
| PUSH RAX | (PUSH1) | OFFSET = −16 |
| PUSH RBX | (PUSH2) | OFFSET = −32 |
| POP RBX  | (POP1)  | OFFSET = −32 |
| POP RAX  | (POP2)  | OFFSET = −16 |

Accordingly, based on the offsets for each instruction, the dependency predictor 109 predicts that POP1 is dependent on PUSH2 and POP2 is dependent on PUSH1. In response to predicting that a stack access instruction is dependent on another stack access instruction, the dependency predictor 109 indicates the dependency to the fixed point unit 112.

To execute stack access instructions, the execution units 111 employ a stack pointer register 119 that stores a memory address for the top of the stack. The load/store unit 120 employs the stack pointer register to identify the memory address for load and store operations resulting from stack access instructions, and the execution units 112 updates the stack pointer register 119 according to the defined or explicit offset for each stack access instruction. For example, for a pop instruction, the load/store unit 120 executes a load operation using the memory address indicated by the stack pointer register 119. In addition, another unit (e.g. a fixed point unit) of the execution units 119 adjusts the value at the stack pointer register by the defined amount (e.g. 16 bytes) associated with the pop operation.

As explained above, the changing of a store instruction's destination register value would conventionally invalidate the store instruction for dependency prediction purposes, because such an adjustment would indicate that a subsequent load that uses the register is targeting a different memory address. However, because the stack pointer register 119 is updated in conjunction with each load or store operation resulting from a stack access instruction, invalidating each store operation that uses the stack pointer register 119 would prevent the dependency predictor 109 from predicting dependencies between stack access instructions. Accordingly, by predicting dependencies for stack access instructions using stack offsets, the dependency predictor 109 can identify potential dependencies between stack access instructions. This allows for store-to-load forwarding and other speculative operations for stack access instructions, improving processing efficiency.

In some embodiments, the scheduler/dispatch unit 110 or another unit, such as a fixed point or floating point unit at the execution units 111, performs store-to-load forwarding, based on dependency predictions for the dependency predictor 109, for stack access instructions and explicit load/store instructions prior to data for the associated store operation being moved to the load store unit 120. By performing store-to-load forwarding prior to moving data to the LSU 120, processing efficiency can be increased.

To illustrate, in response to receiving a load operation (including a load operation resulting from a stack access instruction), the scheduler/dispatch unit 110 determines if the dependency predictor 109 has indicated that the load instruction is predicted to be dependent on a store instruction. If not, the scheduler/dispatch unit 110 picks the load instruction for execution after its memory address has been calculated, and provides the instruction to the LSU 120 for completion. The LSU 120 can determine, based on the calculated memory address, if the load instruction is dependent on any store instruction at its store queue and, if so, forward the store data for the store instruction to the load instruction. If the load instruction is not dependent on a store instruction at the store queue, the LSU 120 retrieves the load data from the address indicated by the instruction and provides it to the fixed point unit 112, which stores it at the PRN indicated by the destination operand of the load instruction.

If the dependency predictor 109 indicates that the load instruction is dependent on a store instruction, the scheduler/dispatch unit 112 transfers the store data of the store instruction to the destination register of the load instruction concurrent with the store data being moved to the LSU 120. The store data is thereby forwarded to the load instruction prior to completion of the movement of the store data to the LSU 120, reducing the latency of the load instruction.

In some cases the prediction information provided by the dependency predictor 109 can incorrectly predict a dependency. Accordingly, in some embodiments a retire stage (not shown) or other stage of the execution pipeline 102 can confirm a store-to-load forward by comparing the calculated memory address for the instruction to which data was forwarded to the calculated memory address for the instruction from which data was forwarded. In response to determining the addresses do not match, or if either of the calculated memory addresses is no longer available for comparison (e.g. because one of the instructions has been retired), the retire stage or other stage indicates an error and the execution pipeline 102 takes remedial action, such as synchronizing the pipeline to an earlier stored state.

Figure 2:
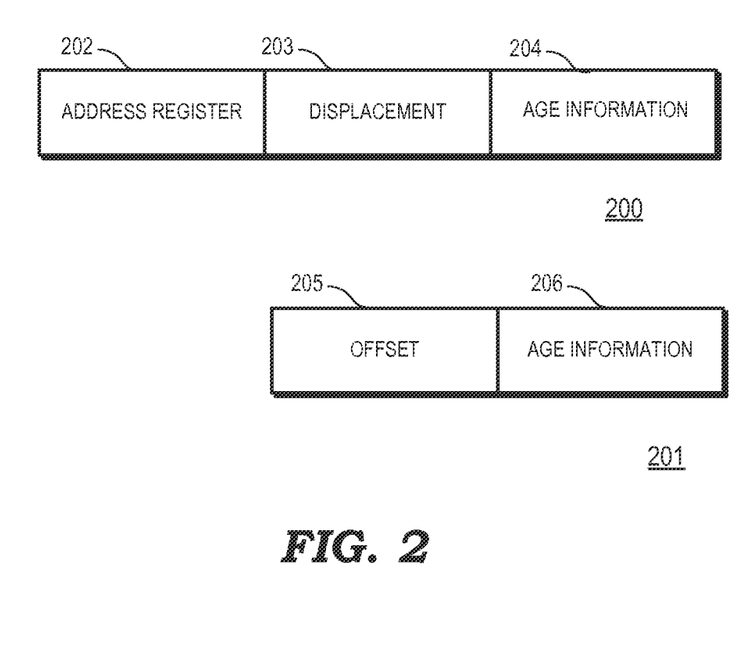
FIG. 2 is a block diagram of an entry of a dependency prediction table of the processor of FIG. 1 in accordance with some embodiments.

FIG. 2 depicts an example entries 200 and 201 of the load/store dependency prediction table 111 and the stack access dependency prediction table 107, respectively, in accordance with some embodiments. In the illustrated example, the entry 200 can store dependency information for one received explicit store instruction. The entry 200 includes an address register field 202, a displacement field 203, and an age field 204. The address register field 202 indicates the architectural register that stores the memory address for the explicit store instruction (the register that stores the memory address where data is to be stored). The displacement field 203 stores an offset that is applied to the memory address to be accessed by the explicit store instruction. The age information field 204 stores information indicating how long the corresponding instruction has been stored at the load/store dependency prediction table 111. The age information field 204 is employed by the dependency predictor 109 to organize the instructions corresponding to the entries of the dependency prediction table 111 relative to each other, and in particular to determine when a particular explicit store instruction was received relative to other explicit store instructions. In some embodiments, the age information field 204 can be omitted, and the age of each instruction indicated by the position of the entry associated with the instruction in the load/store dependency prediction table 111.

For stack access instructions, entry 201 of the stack access dependency prediction table includes an offset field 205 and an age field 206. The offset field 205 stores the stack offset for the stack location corresponding to the stack access instruction. The age field 206 is similar to the age field 204, and is employed by the dependency predictor 109 to organize the instructions corresponding to the entries of the dependency prediction 107 table relative to each other, and in particular to determine when a particular or stack access instruction was received relative to other stack access instructions. In some embodiments, the age information field 206 can be omitted, and the age of each instruction indicated by the position of the entry associated with the instruction in the stack access dependency prediction table 107.

For a received explicit load instruction the dependency predictor 109 uses pattern matching to determine if any valid entry of the load/store dependency prediction table 111 includes a store instruction having a memory address that matches the memory address for the received load instruction. If so, the dependency predictor 109 determines if there are any intervening instructions between the identified store instruction and the received load instruction that change the contents of the memory location corresponding to the memory address or the registers used to calculate the memory address. If not, the dependency predictor 109 indicates to the fixed point unit 112 that the received load instruction is dependent on the store instruction.

For a received stack access instruction (referred to as SA Instruction A) that retrieves data from the stack, the dependency predictor 109 uses pattern matching to determine if any valid entry of the stack access dependency prediction table 107 includes a stack access instruction (referred to as SA Instruction B) having an offset that matches SA Instruction A. If so, the dependency predictor 109 determines if there are any intervening instructions between SA Instruction B and SA Instruction A that change the contents of the memory location corresponding to the matched offset or changed the stack pointer in a manner that is not tracked by the dependency predictor 109. If not, the dependency predictor 109 indicates to the fixed point unit 112 that the SA Instruction A is dependent on SA Instruction B.

Because information for explicit store instructions and for stack access instructions are stored in different tables, different pattern matching techniques can be used to identify dependencies for the different types of instructions. For example, in some embodiments dependencies between stack access instructions can be identified by the dependency predictor 109 using a simple comparison of the offset of a received stack access instruction (as indicated by a field of the instruction or as implied by the type of instruction itself) to the offsets stored at the stack access dependency prediction table 107. Further, the dependency predictor 109 can use a more complex pattern matching process to identify explicit load instructions having a target memory address that matches a memory address for an explicit store instruction stored at the load/store dependency prediction table 111. The pattern matching at the load/store dependency prediction table 111 because of the need to match both address register values and displacement values in order to determine an instruction dependency. Because different tables are used, dedicated logic can be employed at each of the tables 107 and 111 to perform the corresponding pattern matching technique, improving efficiency and simplifying the design of the pattern matching logic at each table.

Figure 3:
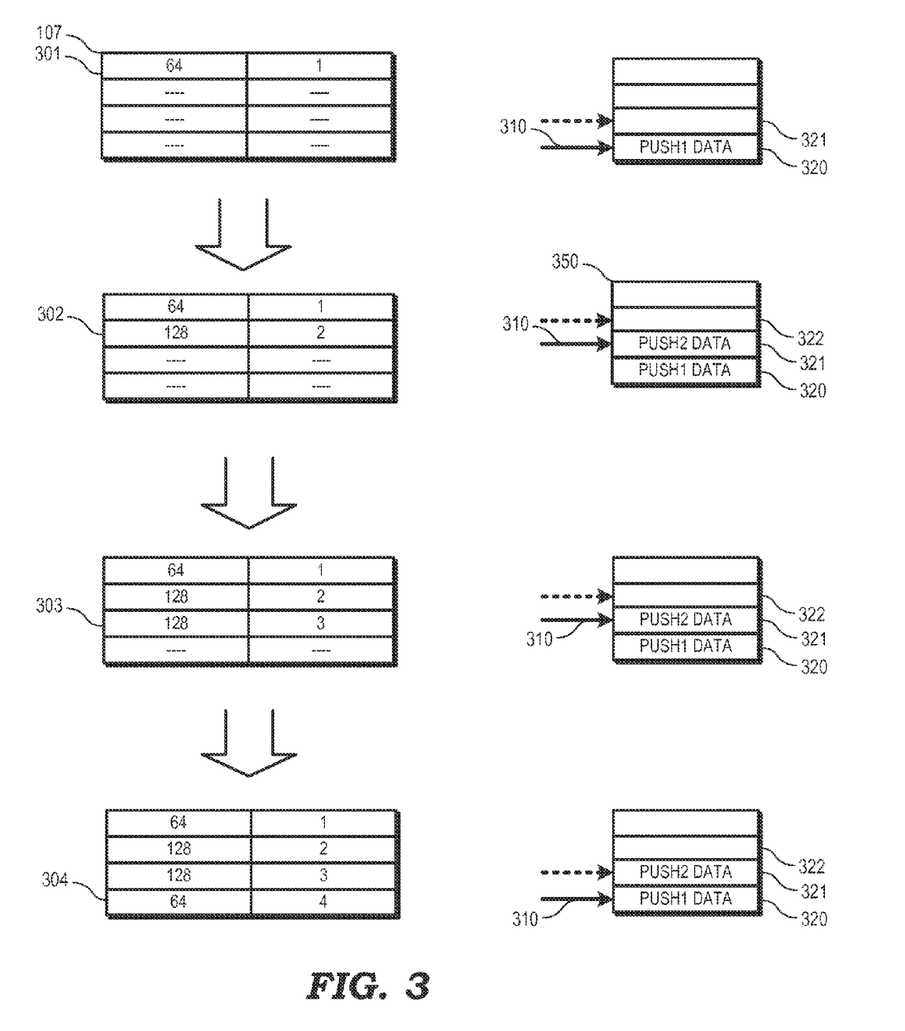
FIG. 3 is a diagram illustrating an example use of the dependency prediction table of FIG. 2 to determine a dependency between stack access instructions.

FIG. 3 illustrates an example of the dependency predictor 109 using the stack access dependency prediction table 107 for stack access instructions in accordance with some embodiments. In the illustrated example, the dependency predictor 109 initially stores, at entry 301 of the dependency predictor table 107, instruction information for a push instruction (corresponding to the PUSH1 instruction from the example above) that sets the stack offset at 16 bytes. Subsequently, the dependency predictor 109 stores, at entry 302, instruction information for a second received push instruction (corresponding to the PUSH2 instruction) that sets the stack offset at 32 bytes. Later, the dependency predictor 109 receives instruction information for a POP instruction (corresponding to the POP1 instruction) that accesses the stack at an offset of 32 bytes. Accordingly, based on the offset information stored at entries 302 and 303, the dependency predictor 109 predicts that the POP1 instruction is dependent on the PUSH2 instruction, and indicates the prediction to the fixed point unit 112. In response, the fixed point unit 112 forwards the store data for the PUSH2 instruction to the target PRN for the POP1 instruction.

Subsequently, the dependency predictor 109 receives instruction information for a POP instruction (corresponding to the POP2 instruction) that accesses the stack at an offset of 16 bytes. Based on the offset information stored at entries 301 and 304, the dependency predictor predicts that the POP2 instruction is dependent on the PUSH1 instruction, and indicates the prediction to the fixed point unit 112. In response, the fixed point unit 112 forwards the store data for the PUSH 1 instruction to the target PRN for the POP2 instruction.

Figure 4:
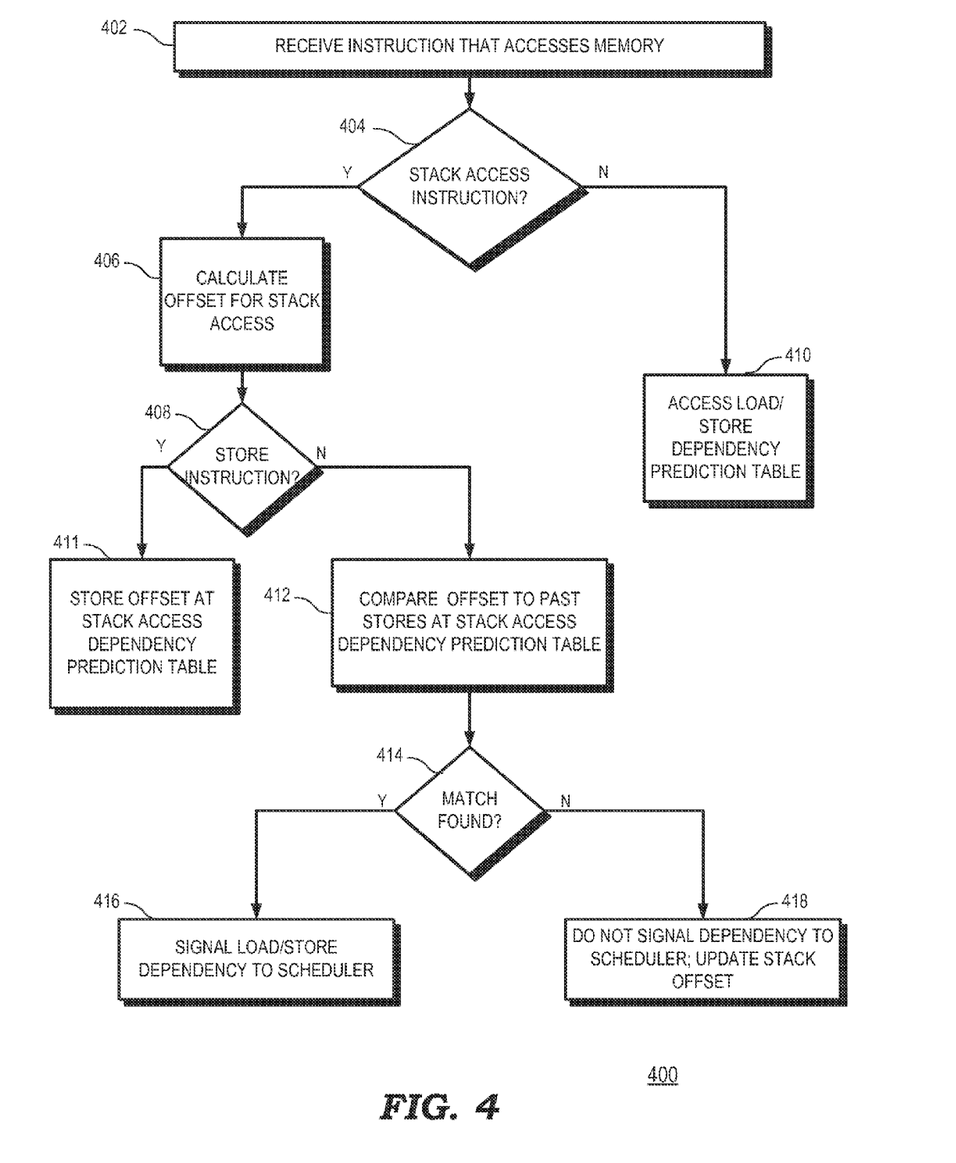
FIG. 4 is a flow diagram of a method of tracking accesses to a stack at a processing system in accordance with some embodiments.

FIG. 4 illustrates a flow diagram of a method 400 of tracking stack accesses at a processor in accordance with some embodiments. The method 400 is described with respect to an example implementation at the processor core 100 of FIG. 1. At block 402 the fetch stage 105 receives, from the instruction cache 104, an instruction that accesses memory, such as a load/store instruction or a stack access instruction. At block 404, the dependency predictor 109 determines, based on an op code of the instruction or other identifier, whether the instruction is an explicit load/store instruction or a stack access instruction based on whether the memory access instruction uses the stack pointer register 119 as an operand. If the instruction is an explicit load/store instruction, the method flow proceeds to block 410 and the dependency predictor accesses the load/store dependency prediction table 111. For example, in some embodiments, the dependency predictor identifies the received instruction as an explicit load instruction, and compares the memory address registers (e.g. the source registers of an explicit load) and the displacement for the instruction to the entries of the load/store dependency prediction table 111 and determines if the comparison indicates a match. If so, the dependency predictor 109 indicates a predicted load/store dependency to the scheduler/dispatch unit 110. The prediction enables store-to-load forwarding or other speculative operations for the load operation. If there is no match with a store instruction the dependency predictor 109 does not indicate a dependency to the scheduler/dispatch unit 110, so that no speculative store-to-load forward takes place.

Returning to block 404, if the memory access instruction is a stack access instruction the method flow moves to block 406 and the dependency predictor 109 calculates the offset for the stack access instruction. At block 408 the dependency predictor 109 determines whether the memory access instruction stores data to the stack (e.g. a push instruction). If so, the method flow moves to block 411 and the dependency predictor 109 stores the calculated offset at an entry of the stack access dependency prediction table 107. If, at block 408, the dependency predictor 109 identifies the memory access instruction as one that retrieves data from the stack (e.g. a pop instruction), the method flow proceeds to block 412 and the dependency predictor 109 compares the calculated offset with the offsets stored at the stack access dependency prediction table 107. In response to a match, the method flow moves to block 416 and the dependency predictor 109 indicates, to the scheduler/dispatch stage 110, a predicted dependency between the received stack access instruction and the stack access instruction that matched in the stack access dependency prediction table 107. If, at block 412, the dependency predictor 109 determines that there is not a match between the calculated offset and any of the offsets stored at the stack access dependency prediction table 107, the method flow moves to block 418 and the dependency predictor 109 does not identify a dependency to the scheduler/dispatch stage 110.

Figure 5:
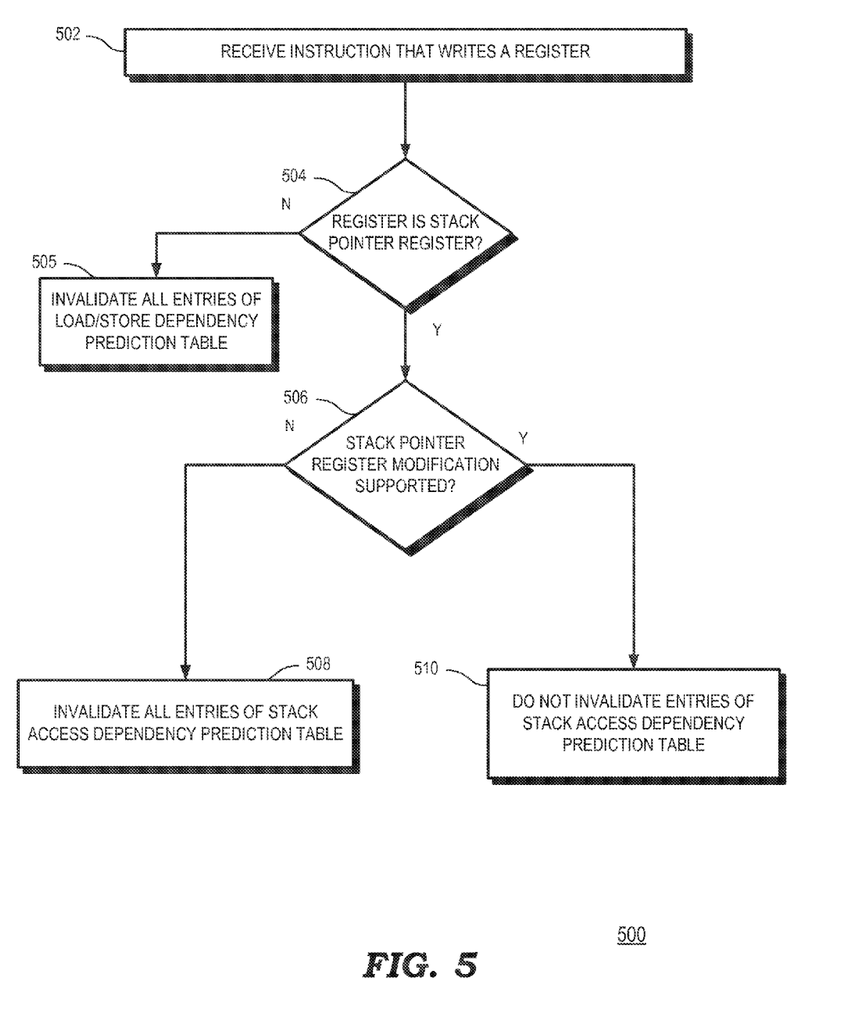
FIG. 5 is a flow diagram of a method of updating a dependency prediction table in accordance with some embodiments.

FIG. 5 illustrates a flow diagram of a method 500 of updating a dependency prediction table in accordance with some embodiments. The method 500 is described with respect to an example implementation at the processor core 100 of FIG. 1. At block 502 the fetch stage 105 receives from the instruction cache 104 an instruction that writes a register, referred to as the target register. At block 504 the dependency predictor determines if the target register is the stack pointer register 119. If not, the method flow proceeds to block 505 and the dependency predictor 109 invalidates all entries of the load/store access dependency prediction table 111 that use the target register as their memory address register. An entry can be invalidated by overwriting or otherwise removing it from the load/store access dependency prediction table 111, by setting a value in the corresponding age information field 204 (FIG. 2) indicating the entry is invalid, and the like. The effect of invalidating an entry is that is no longer eligible for comparison to received instructions that load data from memory (e.g. explicit load instructions), thereby preventing any dependency predictions for the store instruction whose entry was invalidated.

Returning to block 504, if the target register is the stack pointer register 119, the method flow moves to block 506 and the dependency predictor 109 determines if the modification to the stack pointer register 119 is a supported modification. In some embodiments, supported modifications are those that increment and decrement the stack pointer implicitly, such as the implicit modifications of stack access instructions PUSH, POP, CALL and RETURN, while unsupported modifications are those that explicitly modify the stack pointer, such as those resulting from an explicit load or add to the stack pointer register 119. If the modification to the stack pointer register is not supported, the method flow moves to block 508 and the dependency predictor 109 invalidates all entries of the stack access dependency prediction table 107. In other words, the entries for all stack access instructions are invalidated, such that they are no longer eligible for comparison to received stack instructions that load data from the stack (e.g. POP instructions), thereby preventing any dependency predictions for the stack access instructions whose entries were invalidated. If the modification is a supported modification, the method flow proceeds to block 510 and the dependency predictor does not invalidate the entries at the stack access dependency prediction table 107, so that the stack access instructions are still available for dependency predictions.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
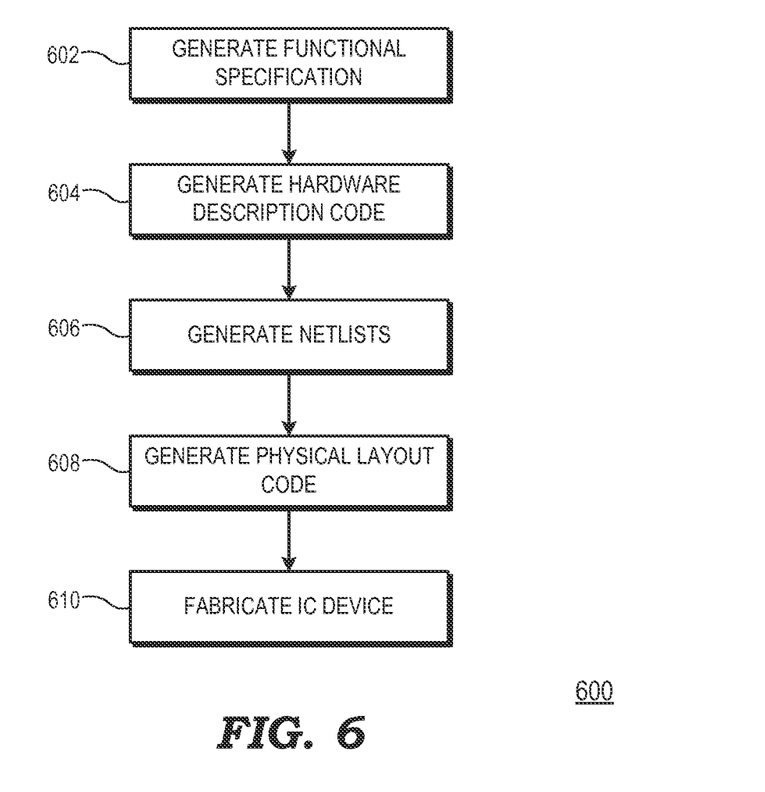
FIG. 6 is a flow diagram illustrating a method for designing and fabricating an integrated circuit device implementing at least a portion of a component of a processor in accordance with some embodiments.

FIG. 6 is a flow diagram illustrating an example method 600 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, a method includes identifying, at an instruction pipeline of a processor, a first location of a stack to be accessed by a first stack access instruction and a second location of the stack to be accessed by a second stack access instruction; identifying, based on a first stack offset value stored at a first table, a dependency between the first stack access instruction and the second stack access instruction in response to the first location of the stack matching the second location of the stack; and identifying a dependency between a load instruction and a store instruction based on an identifier of a first memory address stored at a second table different from the first table. In some aspects, the method includes forwarding data from the first stack access instruction to the second stack access instruction to satisfy the second stack access instruction prior to moving the data from the instruction pipeline to memory in response to the first stack access instruction. In some aspects, the method includes forwarding data from the store instruction to the load instruction to satisfy the load instruction prior to moving the data from the instruction pipeline to memory in response to identifying the dependency between the load instruction and the store instruction. In some aspects, identifying the second location of the stack comprises identifying a second stack offset value of the stack based on the second stack access instruction; and identifying the dependency between the first stack access instruction and the second stack access instruction comprises identifying the dependency in response to the first stack offset value matching the second stack offset value. In some aspects, identifying the first offset comprises identifying the first offset based on a data size associated the first stack access instruction. In some aspects identifying the first offset comprises identifying the first offset based on a field of the first stack access instruction. In some aspects, the method includes accessing the first table in response to determining the second stack access instruction is a stack access instruction. In some aspects, the method includes accessing the second table in response to determining the load instruction is not a stack access instruction. In some aspects the first stack access instruction comprises a push instruction and the second stack access instruction comprises a pop instruction. In some aspects identifying the first location and the second location comprises identifying the first location and the second location at a decode stage of the instruction pipeline.

In some embodiments, a method includes: in response to a prediction at an instruction pipeline that a first stack access instruction is dependent on a second stack access instruction based on offset values stored at a first table, forwarding data associated with the second stack access instruction to satisfy the first stack access instruction prior to moving the data from the instruction pipeline to memory external to the instruction pipeline; and in response to a prediction at the instruction pipeline that a load instruction is dependent on a store instruction based on address register values stored at a second table different from the first table, forwarding data associated with the store instruction to the load instruction to satisfy the load instruction. In some aspects the offset values indicate predicted positions of a stack pointer after execution of the first stack access instruction and the second stack access instruction. In some aspects, the method includes invalidating the offset values stored at the first table in response to identifying an instruction that writes to a stack pointer register.

In some embodiments a processor includes: a cache; and an instruction pipeline comprising: a first table to store a first identifier for a first location of a stack to be accessed by a first stack access instruction; and a second table to store an address register value for a store instruction; and a prediction module to: predict a dependency between the first stack access instruction and a second stack access instruction in response to the first identifier and a second identifier indicating that the first location of the stack matches a second location of the stack to be accessed by the second stack access instruction; and predict a dependency between the store instruction and a load instruction in response to the address register value for the store instruction matching an address register value for the load instruction. In some aspects the instruction pipeline further comprises a scheduler to forward data from the first stack access instruction to the second stack access instruction to satisfy the second stack access instruction prior to moving the data from the instruction pipeline to the cache in response to the first stack access instruction. In some aspects the first and second identifiers comprise offsets from a base of the stack for the first stack access instruction and the second stack access instruction. In some aspects the prediction module is to predict the dependency between the first stack access instruction and the second stack access instruction in response to the offsets for the first stack access instruction and the second stack access instruction matching each other. In some aspects wherein the prediction module is to identify the first identifier based on a data size associated the first stack access instruction. In some aspects the prediction module is to identify the first identifier based on a field of the first stack access instruction. In some aspects the first stack access instruction comprises a push instruction and the second stack access instruction comprises a pop instruction.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:
1. A method comprising:
identifying, at an instruction pipeline of a processor, a first location of a stack to be accessed by a first stack access instruction and a second location of the stack to be accessed by a second stack access instruction;
identifying, based on a first stack offset value stored at a first table, a dependency between the first stack access instruction and the second stack access instruction in response to the first location of the stack matching the second location of the stack; and identifying a dependency between a load instruction and a store instruction based on an identifier of a first memory address stored at a second table different from the first table.

2. The method of claim 1, further comprising forwarding data from the first stack access instruction to the second stack access instruction to satisfy the second stack access instruction prior to moving the data from the instruction pipeline to memory in response to the first stack access instruction.

3. The method of claim 2, further comprising forwarding data from the store instruction to the load instruction to satisfy the load instruction prior to moving the data from the instruction pipeline to memory in response to identifying the dependency between the load instruction and the store instruction.

4. The method of claim 3, wherein:
identifying the second location of the stack comprises identifying a second stack offset value of the stack based on the second stack access instruction; and
identifying the dependency between the first stack access instruction and the second stack access instruction comprises identifying the dependency in response to the first stack offset value matching the second stack offset value.

5. The method of claim 3, wherein identifying the first offset comprises identifying the first offset based on a data size associated the first stack access instruction.

6. The method of claim 3, wherein identifying the first offset comprises identifying the first offset based on a field of the first stack access instruction.

7. The method of claim 1, further comprising:
accessing the first table in response to determining the second stack access instruction is a stack access instruction.

8. The method of claim 7, further comprising:
accessing the second table in response to determining the load instruction is not a stack access instruction.

9. The method of claim 1, wherein the first stack access instruction comprises a push instruction and the second stack access instruction comprises a pop instruction.

10. The method of claim 1, wherein identifying the first location and the second location comprises identifying the first location and the second location at a decode stage of the instruction pipeline.

11. A method, comprising:
in response to a prediction at an instruction pipeline that a first stack access instruction is dependent on a second stack access instruction based on offset values stored at a first table, forwarding data associated with the second stack access instruction to satisfy the first stack access instruction prior to moving the data from the instruction pipeline to memory external to the instruction pipeline; and
in response to a prediction at the instruction pipeline that a load instruction is dependent on a store instruction based on address register values stored at a second table different from the first table, forwarding data associated with the store instruction to the load instruction to satisfy the load instruction.

12. The method of claim 11, wherein the offset values indicate predicted positions of a stack pointer after execution of the first stack access instruction and the second stack access instruction.

13. The method of claim 12, further comprising:
invalidating the offset values stored at the first table in response to identifying an instruction that writes to a stack pointer register.

14. A processor comprising:
a cache; and
an instruction pipeline comprising:
a first table to store a first identifier for a first location of a stack to be accessed by a first stack access instruction; and
a second table to store an address register value for a store instruction; and
a prediction module to:
predict a dependency between the first stack access instruction and a second stack access instruction in response to the first identifier and a second identifier indicating that the first location of the stack matches a second location of the stack to be accessed by the second stack access instruction; and
predict a dependency between the store instruction and a load instruction in response to the address register value for the store instruction matching an address register value for the load instruction.

15. The processor of claim 14, wherein the instruction pipeline further comprises a scheduler to forward data from the first stack access instruction to the second stack access instruction to satisfy the second stack access instruction prior to moving the data from the instruction pipeline to the cache in response to the first stack access instruction.

16. The processor of claim 14, wherein the first and second identifiers comprise offsets from a base of the stack for the first stack access instruction and the second stack access instruction.

17. The processor of claim 16, wherein:
the prediction module is to predict the dependency between the first stack access instruction and the second stack access instruction in response to the offsets for the first stack access instruction and the second stack access instruction matching each other.

18. The processor of claim 16, wherein the prediction module is to identify the first identifier based on a data size associated the first stack access instruction.

19. The processor of claim 16, wherein the prediction module is to identify the first identifier based on a field of the first stack access instruction.

20. The processor of claim 14, wherein the first stack access instruction comprises a push instruction and the second stack access instruction comprises a pop instruction.

* * * * *